United States Patent Office 3,365,036
Patented Jan. 23, 1968

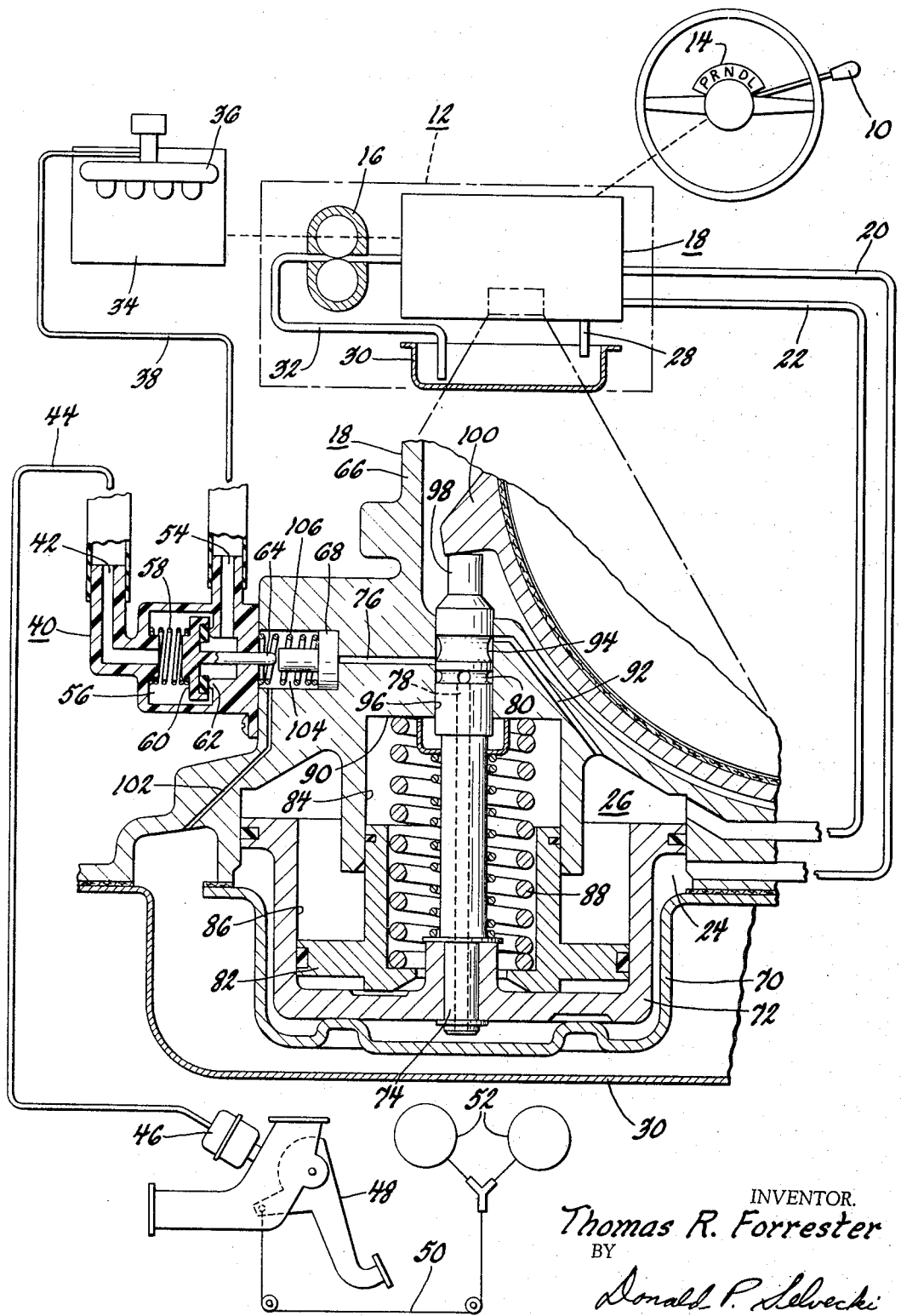

3,365,036
TRANSMISSION ACTUATED PARKING
BRAKE RELEASE
Thomas R. Forrester, Livonia, Mich., assignor to General Motors Corporation, Detroit, Mich., a corporation of Delaware
Filed Aug. 26, 1965, Ser. No. 482,874
9 Claims. (Cl. 192—4)

ABSTRACT OF THE DISCLOSURE

This invention relates to an automatic parking brake release system utilizing vacuum pressure from the engine manifold. Pressures generated in the vehicle automatic transmission are selectively applied to a hydraulic servomotor which in turn opens and closes the vacuum line to the vehicle parking brake. A novel valve structure is needed to accomplish the above-mentioned automatic braking release utilizing pressures generated in the transmission because pressures of different magnitude are generated during modes of transmission selection that are consistent with vehicle motion and these different pressures must necessarily remain segregated at all times.

---

This invention relates to vehicle braking systems and more particularly to a vehicle parking brake release mechanism responsive to movement of a transmission mode selector lever.

Vehicle parking brakes commonly used at the present time operate independently of vehicle automatic transmissions and, in some cases, it is possible to place a transmission mode selector lever in a position consistent with vehicle movement, for example, DRIVE, LOW, or REVERSE, and move the vehicle while the parking brake is still engaged. The high power of present day automobiles makes movement against an engaged parking brake possible and, depending on the amount of force used to engage the brake, can result in relatively long periods of operation of the vehicle with the parking brake yet engaged. The result is excessive break wear and excessive engine loading which separately or together contribute to vehicle depreciation.

Automatic transmission selector levers generally have a PARK position which prevents movement of the vehicle and a NEUTRAL position which is engaged when no movement of the vehicle is desired but a need exists to run the engine. In the following description, the PARK and NEUTRAL positions are deemed to be a mode inconsistent with vehicle motion and, hence, a mode selection which does not interfere with a parking brake being engaged. When the transmission selector level is positioned in any other mode, it is presumed that vehicle motion is desired and, hence, the invention is designed to prevent parking brake engagement during periods of time when these modes are selected.

It is an object of the present invention to provide an improved parking brake release mechanism automatically actuatable when the transmission control lever is positioned in a mode consistent with vehicle motion.

It is another object of the present invention to provide an improved vehicle parking brake system that utilizes engine vacuum to release a parking brake automatically when a transmission control lever is positioned in a manner where movement of the vehicle is desired.

It is still another object of the present invention to provide an improved vehicle parking brake system which utilizes transmission generated fluid pressures to position a vacuum control valve which automatically releases an engaged parking brake.

It is a further object of the present invention to provide an improved vehicle parking brake system which utilizes various pressures generated by a typical automatic transmission to operate a single vacuum control valve directing vacuum pressure from an engine intake manifold to a vacuum actuator adapted to release a parking brake.

Further objects and advantages of the present invention will be apparent from the following description, reference being had to the accompanying drawing wherein a preferred embodiment of the present invention is clearly shown.

In the drawing:

In the single figure drawing, a vehicle parking brake system according to the present invention is diagrammatically shown in section with certain valving mechanism.

Referring to the drawing, the transmission mode selector lever 10 is operatively positioned in the driving compartment of a vehicle and is mechanically linked to an automatic transmission 12 to select a mode of operation therein corresponding to a mode indication on dial 14 positioned within view of a vehicle operator. In the example chosen, dial 14 has a PARK, REVERSE, NEUTRAL, DRIVE and LOW selection but it is understood that any name can be applied to the modes selectable, it being understood that some modes when selected result in vehicle movement and some other modes are normally selected when no vehicle movement is intended. The present invention is operative when a mode is selected which is consistent with a vehicle operator's desire to move the vehicle.

Automatic transmission 12 typically has a pump 16 supplying pressure to gear changing mechanism 18 resulting in the directing of a first operating pressure to line 20 when a mode, such as LOW and REVERSE, is selected and is adapted to generate a second operating pressure to line 22 when another mode, such as DRIVE, is selected. Pump 16 is sometimes referred to herein as second pressure source means. It is understood that lines 20 and 22 are tapped into internal portions of an automatic transmission so as to make a first chamber 24 and a second chamber 26, respectively, responsive to operating pressures within the transmission. Line 28 from gear changing mechanism 18 returns fluid to sump 30 which in turn supplies fluid through line 32 to pump 16 in a conventional fashion.

Engine 34 generates a negative pressure in intake manifold 36 conventionally and charges line 38 to a negative pressure. Intake manifold 36 is sometimes referred to herein as first pressure source means. Line 38 communicates wtih vacuum valve 40, sometimes referred to herein as first control means. Valve 40 has an outlet 42 communicating with outlet line 44 and vacuum actuator 46. Vacuum actuator 46 can act on parking brake 48 in any well-known way which results in the release of the parking brake. A typical operative method would be to withdraw a pawl from engagement with a ratchet, the cooperation of which is adapted to hold the parking brake engaged. Parking brake 48 is a typical foot operated parking brake mechanically providing a force through cable 50 on vehicle brakes 52 to maintain them in an engaged condition.

Vacuum valve 40 has an inlet 54 and an internal chamber 56. Spring 58 is positioned in chamber 56 and biases a sliding valve member 60 against seat 62. The normal position of vacuum valve 40 is closed as shown in the drawing and, unless acted upon by some external force, serves to isolate line 38 from line 44. A valve driver 64 extends into valve body 66 and is acted upon by shiftable valve actuator or second control means 68 in a manner to be hereinafter described.

Vacuum valve 40 is part of overall valve body 66 which houses other operative portions of the mechanism, generally referred to as valve means. Chamber 24 is formed between wall 70 of valve body 66 and sliding piston 72. Spool valve 74 is carried by piston 72 and selectively communicates operating pressures from lines 20 and 22 to passage 76 and ultimately to valve actuator 68. Passage 78, formed in the center of spool valve 74, communicates pressure from chamber 24 to valve groove 80 which, when appropriately positioned, results in fluid communication between chamber 24 and passage 76.

Sliding piston 82 is piloted in bore 84 of valve body 66 and in bore 86 of piston 72. Spring 88 maintains pressure against piston 82 biasing said piston away from wall 90 of valve body 66.

Chamber 26 communicates through passage 92 with groove 94 formed on spool valve 74. It is seen in the drawing that spool valve 74 is slidable in bore 96 formed in valve body 66. Spool valve 74 has an end 98 in driving engagement with clutch member 100 of the automatic transmission cooperating therewith during one mode of operation to operate parts of the vehicle transmission not of concern in this description. Passage 102 serves as an atmospheric vent between chamber 104 of vacuum valve 40 to allow free movement thereof.

In operation, vehicle engine 34 is started in a conventional manner which causes pump 16 to develop an input pressure for transmission 12 and also generates a negative pressure in intake manifold 36. Normally, when this occurs, the vehicle parking brake 48 is engaged and transmission selector lever 10 is in a position in which the PARK or NEUTRAL position on dial 14 is selected. The latter is normally true due to an electrical interconnection not shown between selector lever 10 and the vehicle engine ignition system. As long as any of the modes selected by lever 10 are inconsistent with vehicle movement, no action by the subject invention is necessary and, hence, the valving mechanism described is not operating.

When the vehicle operator intends movement for the vehicle, selector 10 is moved, for example, to select the DRIVE mode. This is the normal selected position for forward movement of the vehicle and pressure is supplied to line 22 from the vehicle transmission and chamber 26 becomes pressurized. Piston 82 is positioned in its lowermost point in bore 86 substantially as shown in the drawing. Pressure is also communicated through passage 92 and groove 94 to passage 76 thereby applying a positive pressure against shiftable valve actuator 68. Valve actuator 68 shifts leftwardly as viewed in the drawing against the force of return spring 106 causing a corresponding movement of valve driver 64 to unseat valve member 60. Vacuum present in line 38 is thereby communicated through chamber 56 to outlet line 44 and is applied in vacuum actuator 46. Vacuum actuator 46 moves in any well-known fashion to release parking brake 48, adapting the vehicle for immediate forward motion. It is thereby seen that, when using the present invention, the selection of the driving mode of the automatic transmission 12 results in the automatic releasing of parking brake 48. As long as the vehicle remains with the driving mode selected, the pressure is applied against shiftable valve actuator 68 and vacuum actuator 46, maintaining parking brake 48 in a disposition in which the parking brake cannot be locked in the ON position. It is clear then that manual operation of the parking brake 48 is still possible for emergency braking purposes but foot pressure must remain on the brake to keep vehicle brakes 52 engaged.

Another cycle of possible operation after an engine start with the parking brake in the engaged position is a selection through lever 10 of the REVERSE or LOW mode of operation. Pump 16 functions in the same manner as previously described and intake manifold 36 provides a negative pressure to line 38. In this latter instance, pressure is supplied through line 20 into chamber 24 resulting in a pressurization of this chamber. Piston 72 carrying spool valve 74 is urged upwardly as seen in the drawing until groove 80 communicates with passage 76. Thereafter, pressure from chamber 24 is communicated through passage 78 and passage 76 to act on shiftable valve actuator 68. Valve actuator 68 functions as previously described for the DRIVE mode selection by unseating valve member 60 allowing negative pressure communication from line 38 to line 44 and vacuum actuator 46. This also results in a release of parking brake 48 in the manner previously described.

When it is desired to actuate parking brake 48 and hold the brake engaged, the transmission selector lever 10 must be positioned in a mode inconsistent with vehicle movement, such as the PARK or NEUTRAL mode, so long as negative pressure is available in line 38. When this occurs, pressure in lines 20 and 22 is relieved by internal workings of the transmission not shown resulting in return springs 58, 106 and 88 returning the associated shifted valves to the position shown in the drawing. When this occurs, vacuum is shut off to outlet 44 resulting in the inactivation of vacuum actuator 46. Thereafter, parking brake 48 is automatically latched when applied and is operative to hold the vehicle against inadvertent movement. When the vehicle engine is not running so that no negative pressure is available in line 38, the brake may remain engaged with the transmission control in any position. This is an important feature when the vehicle is disposed for movement but is not in an operable condition for movement under its own power. The release cycles previously described are automatically carried out to release the parking brake upon the subsequent positioning of selector lever 10 in a mode consistent with vehicle movement.

The example of an automatic transmission is used in this description in that it is the most usual available source of pressure for operation of the valving mechanisms described. It should be understood that it would be within the spirit of the present invention to have an engine driven pump separate from the transmission responsive to movement of a gear shift lever to direct pressures to either chambers 24 or 26 to bring about the automatic parking brake release herein described. Such an arrangement might be necessitated when installed on a vehicle having a manual transmission.

The utility of the present invention is very clear in the environment of a motor vehicle having a parking brake that is engaged when the vehicle engine is started. It is undesirable for reasons previously stated to maintain a parking brake in engaged position when the vehicle is disposed for movement. The present invention obviates the possibility of a vehicle operator inadvertently allowing this situation to develop.

While the embodiment of the present invention, as herein disclosed, constitutes a preferred form, it is to be understood that other forms might be adopted.

What is claimed is as follows:

1. A vehicle parking brake system including an actuator therefor, said vehicle parking brake system comprising: first pressure source means carried by a motor vehicle and operatively connected to the brake actuator; second pressure source means carried by the motor vehicle in cooperation with said first pressure source means; valve means in pressure communication with said first and second pressure source means and being carried by said second pressure source means, said valve means including a plurality of control means, a first control means for said first pressure source means responsive to pressure from said second pressure source means; and selector means for selectively directing pressure from said second pressure source means to said control means to release a vehicle parking brake.

2. A vehicle parking brake system according to claim 1 wherein said second pressure source means is a vehicle automatic transmission and said selector means is the transmission mode selector lever.

3. A vehicle parking brake system including an actuator and release device therefor, said vehicle parking brake system comprising: an automatic transmission for a vehicle having a park and neutral mode separate from forward and reverse modes, said transmission generating separately directed pressures; selector means for shifting said transmission from the park and neutral mode to the forward and reverse modes; valve means carried by said transmission and being communicated with pressures from said transmission while in the forward and reverse modes; and first pressure source means adapted to direct pressure to a vehicle parking brake releasing device when any one of a plurality of pressures from said transmission is directed to said valve means causing a shifting thereof.

4. A vehicle parking brake system including a parking brake actuator and means for releasing the parking brake, said vehicle parking brake system comprising: an automatic transmission generating internal fluid pressures during different modes of operation, said transmission having selector means for manually changing modes of operation of said transmission; first pressure means operated by the vehicle engine and providing pressure for releasing vehicle brakes; and valve means carried by said transmission and being in pressure communication with said first pressure means, said valve means responsive to various transmission generated pressures corresponding to mode changes therein to selectively route pressure from said first pressure means to the vehicle parking brakes to release the parking brakes as the transmission assumes a mode consistent with motion of the vehicle.

5. A vehicle parking brake system according to claim 4 wherein said valve means includes a first control means adapted to isolate said first pressure means from the vehicle brakes; and second control means responsive to pressures generated while in modes of operation consistent with vehicle motion to direct said pressures against said first control means to free the vehicle brakes allowing movement of the vehicle.

6. A vehicle parking brake system according to claim 4 wherein said valve means includes a first control means shiftable in two directions to selectively communicate pressure from said first pressure means to the vehicle brakes; and second control means including a shiftable valve actuator having an operative area movable into a force transmitting disposition relative to said first control means whereby operating pressures from the transmission are directed therethrough to said shiftable valve actuator to move said actuator against said first control means to cause a shifting thereof and a releasing of the vehicle brakes.

7. A vehicle parking brake system according to claim 6 wherein said valve means includes a spool valve carried thereby and a plurality of chambers pressurizable by different operating pressures of the transmission generated during selected modes thereof consistent with vehicle motion, one of said operating pressures being transmitted during a first selected mode directly to said second control mean to move said shiftable valve actuator therein, another of said operating pressures acting during a second selected mode through a spool valve against said shiftable valve actuator of the second control means to move said shiftable valve actuator to a position where the second mentioned operating pressure acts therethrough against said first control means.

8. A vehicle parking brake system comprising: a pedal operated mechanically actuatable parking brake; vacuum operated releasing means drivably engaging said parking brake and including a vacuum actuator for releasing said parking brake and a line communicating engine vacuum to said vacuum actuator; valve means including first control means supplied operating pressures by a vehicle automatic transmission and arranged to selectively control vacuum communication from the vehicle engine to said vacuum actuator in response to operating pressures generated during selected modes of transmission operation; and a transmission control lever for changing operating modes of the transmission thereby disposing the transmission for generating pressures during mode selection consistent with vehicle movement to operate said valve means to insure parking brake releasing by vacuum pressure during mode selection of the transmission consistent with vehicle movement.

9. A vehicle parking brake system including a shiftable valve actuator and a spool valve for directing pressures thereto according to claim 8 wherein said valve means has first and second chambers selectively pressurizable by pressures generated in the automatic transmission during various modes of operation; a first of said chambers responding to pressures generated during a drive mode selection of said transmission to route the generated transmission pressure directly to a shiftable valve actuation of said first control means to cause a parking brake release, a second of said chambers responding to pressures generated during a reverse and low mode selection of said transmission to reposition a spool valve thereby allowing pressure from said second chamber to act on said shiftable valve actuator of said vacuum control means to release the parking brake.

References Cited

UNITED STATES PATENTS

| | | | |
|---|---|---|---|
| 2,759,569 | 8/1956 | Keehn | 188—265 X |
| 3,119,477 | 1/1964 | Ryder | 192—4 X |
| 3,136,399 | 6/1964 | Granryd | 192—4 |
| 3,255,852 | 6/1966 | Martin et al. | 192—4 |
| 3,270,840 | 9/1966 | Claire | 192—4 |

BENJAMIN W. WYCHE III, *Primary Examiner.*

UNITED STATES PATENT OFFICE
CERTIFICATE OF CORRECTION

Patent No. 3,365,036                  January 23, 1968

Thomas R. Forrester

It is hereby certified that error appears in the above numbered patent requiring correction and that the said Letters Patent should read as corrected below.

Column 1, line 53, for "level" read -- lever --; column 2, line 24, after "LOW" insert -- mode --; column 6, line 4, for "mean" read -- means --; line 37, for "actuation" read -- actuator --.

Signed and sealed this 18th day of March 1969.

(SEAL)
Attest:

Edward M. Fletcher, Jr.                EDWARD J. BRENNER
Attesting Officer                     Commissioner of Patents